(12) United States Patent
Hellmann et al.

(10) Patent No.: US 11,016,463 B2
(45) Date of Patent: May 25, 2021

(54) CONTROL AND DATA-TRANSFER SYSTEM, GATEWAY MODULE, I/O MODULE, AND METHOD FOR PROCESS CONTROL

(71) Applicant: Phoenix Contact GmbH & Co. KG, Blomberg (DE)

(72) Inventors: Klas Hellmann, Hameln (DE); Viktor Oster, Blomberg (DE)

(73) Assignee: PHOENIX CONTACT GMBH & CO.KG, Blomberg (DE)

( * ) Notice: Subject to any disclaimer, the term of this patent is extended or adjusted under 35 U.S.C. 154(b) by 264 days.

(21) Appl. No.: 15/326,478

(22) PCT Filed: Jul. 15, 2015

(86) PCT No.: PCT/EP2015/066205
§ 371 (c)(1),
(2) Date: Jan. 14, 2017

(87) PCT Pub. No.: WO2016/008948
PCT Pub. Date: Jan. 21, 2016

(65) Prior Publication Data
US 2017/0212490 A1    Jul. 27, 2017

(30) Foreign Application Priority Data

Jul. 16, 2014  (DE) .................. 10 2014 110 017.4

(51) Int. Cl.
*G05B 19/048* (2006.01)
*H04L 12/40* (2006.01)
(Continued)

(52) U.S. Cl.
CPC ............. *G05B 19/048* (2013.01); *G05B 9/03* (2013.01); *G05B 19/4185* (2013.01);
(Continued)

(58) Field of Classification Search
CPC .... G05B 19/048; G05B 9/03; G05B 19/4185; H04L 12/40019; H04L 12/4625; H04L 67/125
(Continued)

(56) References Cited

U.S. PATENT DOCUMENTS 5,526,490 A * 6/1996 Nishikawa ............ G06F 13/122
709/225
5,734,920 A * 3/1998 Gotoh ................... G06F 13/124
710/5
(Continued)

FOREIGN PATENT DOCUMENTS

CN    102183946 A    9/2011
DE    199 39 567 A1    3/2001
(Continued)

OTHER PUBLICATIONS

Russian Office Action dated Feb. 28, 2018, issued in connection with Russian Application No. 2017104863, with English translation.
(Continued)

*Primary Examiner* — Kevin S Mai
(74) *Attorney, Agent, or Firm* — John Maldjian; Maldjian Law Group LLC

(57) ABSTRACT

Meeting the safety requirements of automation systems in a more flexible manner, the invention provides a control and data transmission system for controlling safety-critical processes comprising a plurality of I/O modules connected via a first communication network to a gateway module. The gateway module is connected to a second communication network hierarchically superior to the first communication network and acts as a gateway between the first and the second communication networks. At least one of the I/O modules comprises a diagnosis unit for generating status data relating to the functional state of an input and/or output
(Continued)

and/or of a process device. The gateway module and the I/O modules communicate via the first communication network in a safe manner to transfer status data and input and/or output data. The gateway module performs safety processing of the status data and/or of the input and/or output data.

15 Claims, 4 Drawing Sheets

(51) Int. Cl.
*H04L 12/46* (2006.01)
*G05B 9/03* (2006.01)
*G05B 19/418* (2006.01)
*H04L 29/08* (2006.01)

(52) U.S. Cl.
CPC .... *H04L 12/40019* (2013.01); *H04L 12/4625* (2013.01); *H04L 67/125* (2013.01); *G05B 2219/14014* (2013.01); *G05B 2219/24008* (2013.01); *G05B 2219/25324* (2013.01); *G05B 2219/25428* (2013.01); *H04L 2012/4026* (2013.01); *H04L 2012/40221* (2013.01)

(58) Field of Classification Search
USPC ......................................................... 709/224
See application file for complete search history.

(56) References Cited

U.S. PATENT DOCUMENTS

| | | |
|---|---|---|
| 6,466,539 B1 | 10/2002 | Kramer et al. |
| 6,832,343 B2 | 12/2004 | Rupp et al. |
| 7,173,909 B2 | 2/2007 | Deuter et al. |
| 8,125,109 B2 | 2/2012 | Dold |
| 8,660,012 B2 | 2/2014 | Pape et al. |
| 2008/0150713 A1 | 6/2008 | Kalhoff et al. |
| 2011/0170434 A1 | 7/2011 | Pape et al. |
| 2013/0253706 A1* | 9/2013 | Hada ...................... G05B 19/18 700/275 |
| 2015/0177724 A1* | 6/2015 | Miyazaki ........... G05B 19/0425 710/104 |

FOREIGN PATENT DOCUMENTS

| | | |
|---|---|---|
| DE | 10 2006 054 124 B4 | 5/2008 |
| DE | 20 2008 017 894 U1 | 10/2010 |
| EP | 0 837 394 A2 | 4/1998 |
| EP | 1 251 416 A1 | 10/2002 |
| EP | 1 936 457 B1 | 6/2008 |
| EP | 2 348 373 A1 | 7/2011 |
| EP | 2 667 304 A2 | 11/2013 |
| RU | 2263952 C2 | 11/2005 |
| RU | 82 790 U1 | 5/2009 |
| WO | 98/44469 A2 | 10/1998 |
| WO | 2006/008257 A1 | 1/2006 |

OTHER PUBLICATIONS

International Search Report issued in connection with corresponding International Application No. PCT/EP2015/066205 dated Oct. 9, 2015 (3 pages total).
Chinese Office Action dated Jul. 31, 2018 in connection with corresponding Chinese Patent Application No. 201580038578.9 with English Language translation (19 pages total).
European Office Action dated Oct. 5, 2018 issued in connection with corresponding European Patent Application No. 15739 558.3 (5 pages total).
International Preliminary Report on Patentability for International Application No. PCT/EP2015/066205, dated Jan. 26, 2017, 1 Page.
Written Opinion of the International Searching Authority for International Application No. PCT/EP2015/066205, dated Jan. 26, 2017, 8 Pages.
Notification of Transmittal of Translation of the International Preliminary Report on Patentability for International Application No. PCT/EP2015/066205, dated Jan. 26, 2017, 1 Page.

* cited by examiner

CONTROL AND DATA-TRANSFER SYSTEM, GATEWAY MODULE, I/O MODULE, AND METHOD FOR PROCESS CONTROL

FIELD

The present invention generally relates to automation technology and, more particularly, to a control and data transmission system for controlling safety-critical processes involving a plurality of input and/or output modules which are connected to a gateway module via a communication network, and also relates to a method for a safe process control.

BACKGROUND

In automation technology, process control is often accomplished using a control unit that is connected, via a communication system, to decentralized input and output modules, or I/O modules for short. The connection to the process to be controlled is effected by sensors and actuators which are connected to respective I/O modules, the I/O modules receiving input data from sensors and outputting output data to actuators.

The communication system may be a field bus system, for example. It is likewise possible that a hierarchical communication structure is provided, in which case different communication networks can be interconnected by a gateway module. For example, it is known to use modular stations which comprise a bus coupler and a plurality of I/O modules, for example in the form of electronic plug-on modules, and in this case the communication between the bus coupler and the I/O modules is usually effected via a local bus, and the bus coupler has an interface to a higher level fieldbus. The connection within the local bus can be made by means of contacts without cables, and for this purpose the bus coupler and the I/O modules are snap-connected onto a mounting rail, in particular a DIN hat rail. A gateway module which comprises the bus coupler and which connects the local bus to a hierarchically superior communication network is also referred to as a bus terminal in this context.

It is often necessary to implement safety functions for the protection of humans, machines, or the environment, for example shut-down of a machine after a protective door has been opened or an emergency stop switch has been actuated. The input and output data which are processed and/or generated by safety functions and which are therefore relevant to safety are usually processed by safe I/O modules and are exchanged between a control unit and the I/O modules using a safe transfer protocol.

Known standards for the development of electrical, electronic and programmable electronic systems that perform a safety function are IEC 61508 and ISO 13849, for example.

Currently, special safe input and output modules are used for the acquisition of safety-relevant signals, which modules gather the signals redundantly and check them for plausibility and errors within the device. For this purpose, at least two cores or channels are necessary, which are typically implemented by means of microprocessors which process the acquired data in two channels and compare them with one another. Subsequently, safe communication is implemented separately in each module. Modular stations comprising a plurality of modules usually use safe input and output modules which operate independently of one another and are individually addressed by the higher level control unit.

In addition, the modular stations usually also include modules for the acquisition of signals that are not safety-relevant, which modules are typically configured with a single channel, and further comprise at least one gateway module for coupling the station to the respective higher level network that is used. The gateway module disclosed herein is also a smart device, insofar as it adapts to the network and accordingly converts the data from the local I/O modules.

Thus, different I/O modules are employed for safety-relevant and non-safety-relevant signals. This increases the efforts involved in development, manufacturing, logistics, training and all aspects related to automation. Moreover, the number of cores implemented with microprocessors within such a station increases with each further module, making them technically and commercially more complex. In addition, depending on the network employed, a different safety protocol has to be implemented for the transfer of the safety-relevant signals. This further increases the variety of the modules.

The invention is based on the objective of providing a way in which safety requirements imposed on an automation system can be met in an improved, optimized or more flexible in nature compared to prior disclosures.

The aforementioned technical objective is achieved through the present invention.

SUMMARY

Accordingly, embodiments of the invention provide a control and data transmission system for controlling safety-critical processes. The invention, at least, comprises a plurality of I/O modules that are connected via a first communication network to a gateway module and wherein the gateway module is connected to a second communication network hierarchically superior to the first communication network and acts as a gateway between the first and the second communication network. At least one of the I/O modules comprises a diagnosis unit for generating status data relating to the functional state of an input and/or output and/or of a process device connected to an input or output. Furthermore, the gateway module and the I/O modules are adapted to communicate via the first communication network in a safe manner to transmit status data and input and/or output data. The gateway module is furthermore adapted to perform safety-related processing of the status data and/or of the input and/or output data.

Advantageously, the safety-related processing of the status data and/or of the input and/or output data by the gateway module may additionally comprise the execution of at least one safety function. In this case, preferably, the safety function generates safety-related output data on the basis of safety-related input data and on the basis of the transferred status data. A safety function may as well include a safe association which is used for safety-related association of redundantly provided signals or data, for example.

The I/O modules may advantageously be configured as input and/or output modules, which means they have input and/or output terminals for connecting process devices such as sensors and/or actuators.

The gateway module preferably processes the input data and the status data of the input modules in a manner so that the input data comply with the requirements of the safety standards. The safe input data can then be transmitted to a higher level safety control unit and/or to a higher level standard control unit. Additionally or alternatively, these data can be safely processed within the gateway module and the result can be supplied to the outputs.

On the output side, the gateway module is preferably responsible for the transmission of the output data and the diagnosis of the output circuits, so that the state of the output modules is monitored in order to be able to react accordingly in the event of a fault.

The outputs may, for example, be controlled so that two output modules are controlled which together define a safe two-channel output. However, it is also possible, for example, to use common outputs which are monitored, and only one upstream safe output module is provided which, in the event of a fault, switches off power supply to the common output modules.

A key idea of the present invention is to shift the safety logic into the gateway module instead of providing it in the individual I/O modules, so that, advantageously, the acquisition of safety-relevant signals is made using I/O modules which usually are only configured for not safety-relevant signals, in particular with single-channel I/O modules. Since in terms of physics the general signals are the same in the case of safety-relevant I/O modules and not safety-relevant I/O modules it is in particular contemplated according to the invention to capture safety-related and not safety-related signals with identical I/O modules, whereby flexibility is increased since fewer different I/O modules need to be used. This allows development efforts to be significantly reduced as well. So, preferably, safety-relevant input data are also acquired by a single-channel input module and/or safety-relevant output data are output by a single-channel output module.

In accordance with the invention, checking and cross-checking of data, which according to the prior art takes place in two-channel I/O modules for safety-relevant signals, is performed at a central location in the gateway module. For this purpose, the gateway module preferably comprises a safety logic having a redundant design and adapted for executing safety-related processing of status data and/or of input and/or output data and/or for executing a safety function.

In a particularly advantageous embodiment of the control and data transmission system, the first communication network is a local bus, and the I/O modules are configured as modular input and output devices. The local bus preferably supports at least one selected bus protocol, for example a field bus protocol such as INTERBUS or Profibus. In principle, however, any suitable bus protocol can be used. Since the connection within the local bus is advantageously made without cables, by contacts that are snap-connected onto a mounting rail, the local extension within the station comprising the gateway module and the I/O modules is limited. It has been discovered that with this embodiment, a complete safety protocol as known from the prior art for the transfer of safety-related data is not required, rather sufficient safety can be ensured by a few technical measures against data corruption and irregularities in the data transfer. Safe communication is only necessary from the gateway module, also referred to as a bus terminal, to the second, higher level communication network. The second communication network may be configured as a field bus, for example.

Process control is typically accomplished using a control unit that is connected to the second communication network, for example in the form of a programmable logic controller (PLC). Since the safety-related logic processing is performed by the gateway module, the gateway module is adapted for processing both safety-related and not safety-related data. It is moreover conceivable that the gateway module performs the process control for the local station, meaning that the complete control of the inputs and outputs of the I/O modules connected to the first communication network.

As found, only a few diagnosis extensions are required in the I/O modules instead of the safety logic used according to the prior art for capturing the safety-related physical signals in a safe manner and transferring them to the gateway module in the present invention. These are used in particular for diagnosis of the transfer path from the I/O module to the gateway module and for diagnosis of the peripherals and the inputs and outputs.

Accordingly, the gateway module and the I/O modules are adapted for safe communication. The modules are adapted for exchanging data telegrams for safe communication are particularly advantageous as they comprise a checksum and/or at least a counter value, and the counter value is incremented after each successfully transmitted data telegram. The checksum may be a Cyclic Redundancy Check (CRC), for example. By virtue of the dynamics, i.e. the change in the counter value, it is possible to detect errors in the data transfer, in particular lost or duplicated data telegrams.

According to a particularly advantageous embodiment, it is furthermore contemplated that for each of the I/O modules connected to the first communication network the respective data telegram comprises a different, individual counter value. The use of individual counters which have respective different values in a data telegram for each of the I/O modules particularly advantageously enables a diagnosis of the addressing of the individual I/O modules within the station. Advantageously it may be contemplated that a common data telegram passes through all the I/O modules connected to the first communication network and comprises the respective individual counter values for the I/O modules.

In contrast to the prior art, the individual I/O modules only use simple diagnosis instances which support the safety logic in the gateway module for fault detection. For this purpose, at least one I/O module, typically all I/O modules, has/have a diagnosis unit which is adapted for diagnosing the inputs and/or outputs of the respective I/O module and/or for diagnosing a process device connected to an input or output of the respective I/O module, and for generating corresponding status data. For example, a diagnosable fault of an input or output may be a short circuit to ground that occurred.

For diagnosis of the peripherals, i.e. of a connected process device such as a sensor or actuator, it is advantageously contemplated that the diagnosis unit in the respective I/O module exchanges data with an associated diagnosis unit which is arranged in a process device connected to an input or output of the I/O module. In this way it is possible to detect and query faults in the peripheral device by the diagnosis unit in the I/O module.

Particularly advantageously, the diagnosis unit of at least one I/O module and/or the diagnosis unit of a process device connected to the I/O module can be controlled by control data transmitted from the gateway module. For this purpose, different diagnosis instances may be provided within the diagnosis units in the I/O modules and/or in the connected peripheral devices, which are addressed by the safety logic located in the gateway module and are checked for faulty behavior by the expectations in the safety logic. Thus, the diagnosis units in the I/O module and/or in the process device are remote controlled by the gateway module. Therefore, separate protection and diagnosis evaluation in the I/O modules is not required. Processing of the I/O data and diagnosis data is exclusively executed in the gateway module.

Further deficiencies in prior disclosures are also remedied by the described embodiments of the present invention.

Accordingly, a gateway module is provided for use in the described control and data transmission system, which gateway module comprises interfaces for connection to a first and a second communication network, the gateway module being connectable to a plurality of I/O modules via the first communication network, and the gateway module being adapted to communicate with the I/O modules via the first communication network in a safe manner to transmit input and/or output data and to receive status data from at least one I/O module. Furthermore, the gateway module comprises a safety control unit in particular in the form of a safety logic which is adapted for executing safety processing, i.e. safety-related processing, of the status data and/or of the input and/or output data.

On the basis of the safety-related processing in the gateway module, safety functions may advantageously be executed in a higher level safety control unit. However, according to an advantageous embodiment it may also be contemplated that the gateway module is adapted to execute at least one safety function which preferably generates safety-related output data on the basis of safety-related input data and on the basis of received status data. In such an embodiment, advantageously, the execution of safety functions in a higher level safety control unit can be dispensed with, however it is likewise possible that additional safety functions are executed in a higher level safety control unit.

Furthermore, all the embodiments of such a gateway module that have been described above in conjunction with the control and data transfer system are also within the scope of the invention.

Accordingly, in another embodiment of the present invention, an I/O module for use in the described control and data transmission system is provided, which comprises at least one input and/or output for connecting a process device, in particular in the form of a sensor or actuator, a diagnosis unit for generating status data relating to the functional state of the input and/or output and/or of a process device connected to the input and/or output, and an interface for connection to a communication network, and the I/O module is adapted to communicate with a gateway module via the communication network in a safe or safety-related manner.

Moreover, all the embodiments of such an I/O module that have been described above in conjunction with the control and data transmission system are also within the scope of the invention.

Accordingly, a method is provided for a safe or safety related process control in a control and data transmission system which comprises a plurality of I/O modules, wherein the I/O modules are connected to a gateway module via a first communication network, and wherein the gateway module is connected to a second communication network hierarchically superior to the first communication network and acts as a gateway between the first and second communications network. The method comprises generating status data by a diagnosis unit located in at least one of the I/O modules, the status data comprising information relating to the functional state of an input and/or output of the I/O module and/or of a process device connected to the input and/or output of the I/O module, executing a safe communication between the gateway module and the I/O modules via the first communication network to transfer status data and input and/or output data, and safety-related processing of the status data and/or of the input and/or output data by the gateway module.

The safety-related processing may advantageously comprise the execution of at least one safety function by the gateway module, in which case the safety function generates safety-related output data on the basis of safety-related input data and on the basis of status data.

Preferably, the method comprises all the necessary method steps for operating the above-described embodiments of a control and data transmission system or combinations thereof.

Furthermore, the method may advantageously be adapted for remote controlling, by the gateway module, a diagnosis unit arranged in one of the I/O modules, for which purpose control data are transmitted from the gateway module to the diagnosis unit.

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The invention will now be described in more detail by way of preferred exemplary embodiments and with reference to the accompanying drawings. The foregoing and other aspects of the embodiments disclosed herein are best understood from the following detailed description when read in connection with the accompanying drawings. For purposes of illustrating the embodiments disclosed, the preferred embodiments are shown in the drawings. However, the embodiments disclosed herein are not limited to the specific instrumentalities disclosed. The same reference numerals in the drawings designate the same or equivalent parts. Included in the drawings are the following figures.

Figure 1:
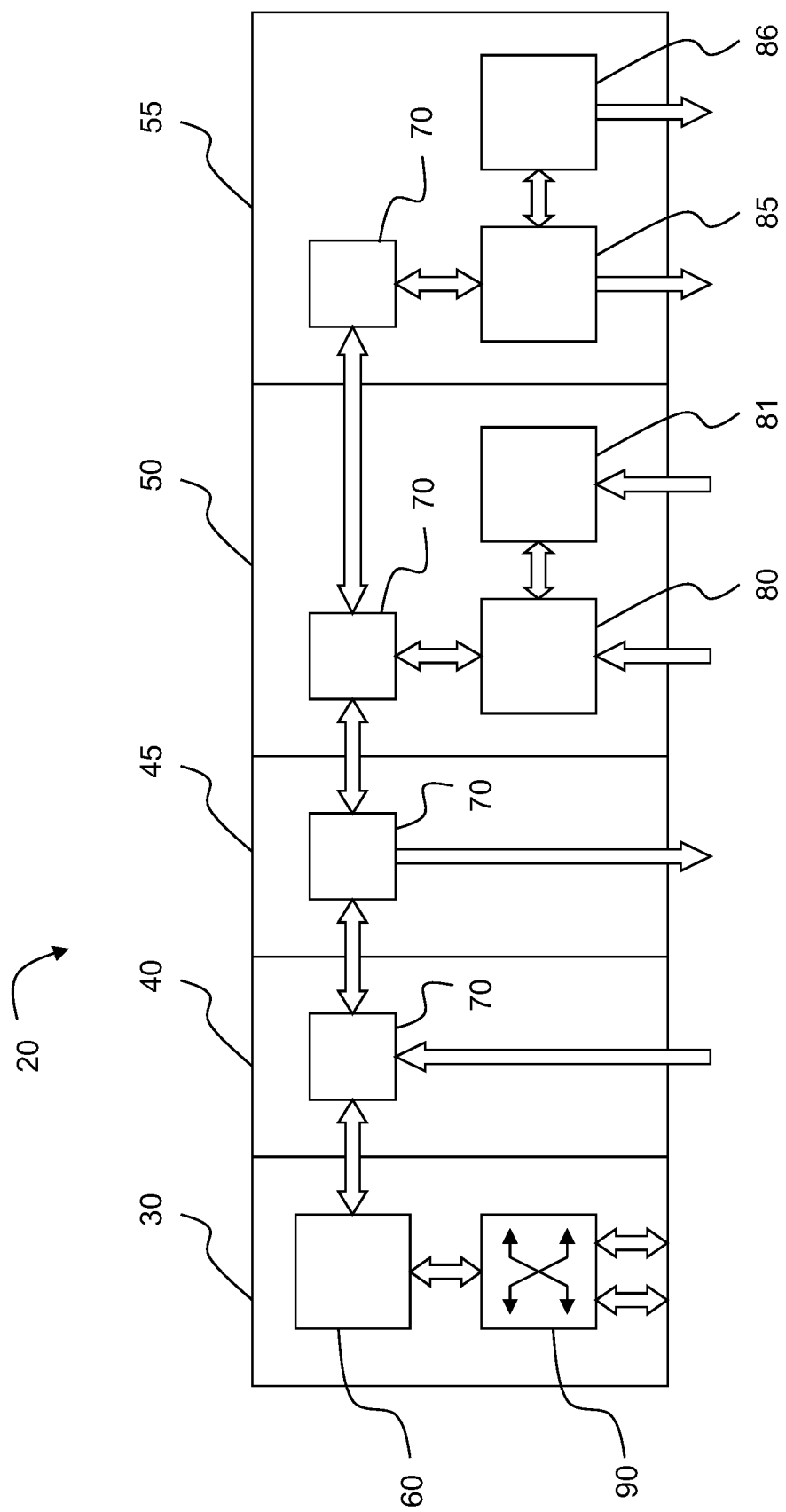
FIG. 1 shows a schematic diagram of a control and data transmission system known from prior art.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modification, equivalents, and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present disclosure will be described below in conjunction with exemplary control and data transmission systems, gateway modules, I/O modules, and methods for process control. Those skilled in the art will recognize the disclosed techniques may be used in building any railing that may be aesthetically pleasing.

The phrases "at least one", "one or more", and "and/or" are open-ended expressions that are both conjunctive and disjunctive in operation. For example, each of the expressions "at least one of A, B and C", "at least one of A, B, or C", "one or more of A, B and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 schematically shows a control and data transmission system 20 known from prior art, which comprises a plurality of I/O modules 40, 45, 50, and 55, each one connected, via a bus interface 70, to a bus master 60 that is located in a gateway module 30. Gateway module 30 further comprises a network coupler 90 for connection to a higher level network. Typically, a control unit (not shown in FIG. 1) is connected to this higher level network, which individually addresses the I/O modules 40, 45, 50, and 55, which are operating independently from each other. I/O modules 40 and 50 are configured as input modules, and I/O modules 45 and 55 are configured as output modules. I/O modules 50 and 55 are configured as special safety I/O modules in which the signals are captured twice and checked within the device for plausibility and errors, and for this purpose two cores 80 and 81, and 85 and 86, respectively, are provided, which are implemented by microprocessors.

Figure 2:
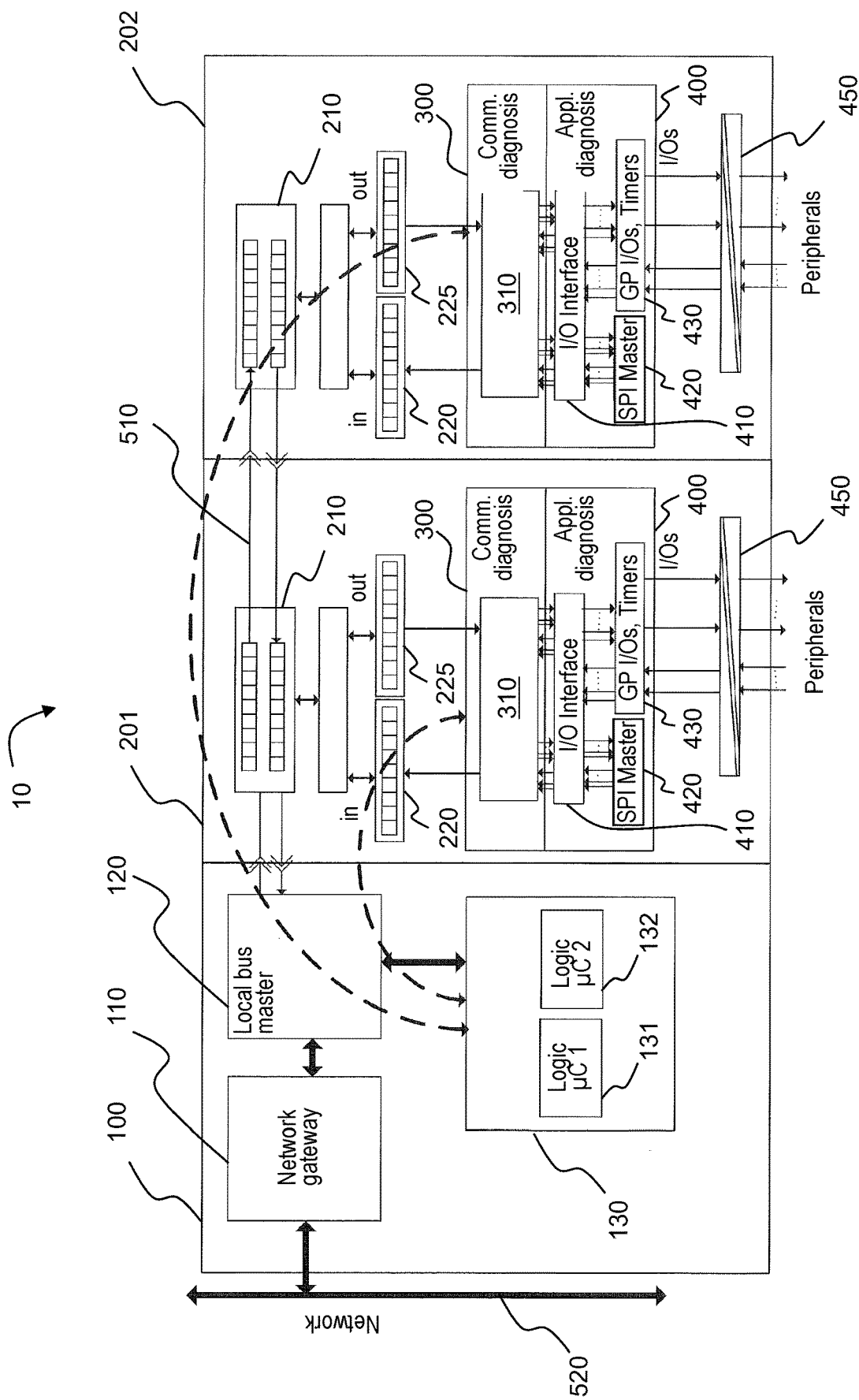
FIG. 2 shows a schematic diagram of a preferred embodiment of a control and data transmission system according to the invention.

FIG. 2 schematically illustrates a preferred embodiment of a control and data transmission system 10 according to the invention, in which the two-channel I/O modules known from prior art for capturing safety-relevant signals have been dispensed with.

Control and data transmission system 10 comprises a gateway module 100, and I/O modules 201 and 202 which are able to communicate with one another via a local bus 510. In the illustrated exemplary embodiment, local bus 510 is configured as a ring bus, and for communication with the I/O modules 201 and 202, local bus master 120 in the gateway module generates a data telegram which is passed through all the I/O modules connected to the bus 510, in the manner of a shift register. For the sake of simplified illustration, only two I/O modules 201 and 202 are shown. However, a significantly greater number of I/O modules may be provided. The illustrated embodiment of the local bus 510 as a ring bus is merely by way of example, any other suitable bus topology may be used as well. Furthermore, a selected bus protocol is preferably used for communication via the local bus 510, preferably a fieldbus protocol. However, in principle any suitable communication protocol can be used.

According to the invention, the safety logic is shifted from the I/O modules into the gateway module 100. This is symbolized in FIG. 2 by the dashed arrows. The gateway module 100 accordingly comprises a safety control unit 130 which is connected to local bus master 120. Advantageously, safety control unit 130 comprises two redundant cores 131 and 132 that are implemented by means of microprocessors, the results of which are compared with each other. Safety control unit 130 is in particular adapted to execute a safety function which generates safety-related output data on the basis of safety-related input data.

The execution of the safety function by gateway module 100 additionally occurs on the basis of status data which are generated by diagnosis units 400 in the I/O modules and are transferred to the gateway module 100.

Communication between gateway module 100 and I/O modules 201 and 202 is effected in a safe manner, and for this purpose the I/O modules comprise a communication diagnosis unit 300 each of which is connected to a bus interface 210 via registers 220 and 225 for input and output data. Communication diagnosis unit 300 comprises a unit 310 configured for performing a safe communication. Advantageously, it may be contemplated for unit 310 to be provided in the form of a chip. Furthermore, the communication diagnosis unit 300 and the unit 310 for performing safety communication may be implemented in a common chip, optionally with registers 220 and 225 and/or with the bus interface 210. Communication diagnosis unit 300 is connected to diagnosis unit 400 which is adapted for diagnosis of an input and/or output and/or of a process device connected to an input or an output and for generating corresponding status data. Advantageously, diagnosis unit 400 may also be configured as a chip, or may also be implemented on a common chip together with communication diagnosis unit 300.

In the illustrated exemplary embodiment, diagnosis unit 400 comprises a Serial Peripheral Interface (SPI) master 420 which is connected, via an I/O interface 410, to an I/O unit 430 comprising the inputs and outputs and optionally provided timers. I/O interface 410 is connected to the unit 310 of communication diagnosis unit 300. The inputs and/or outputs which are embodied as general purpose inputs/outputs (GP I/Os), for example, are connected to one or more process devices, i.e. to peripheral devices such as sensors or actuators, via interface 450. Interface 450 may serve to perform signal adaptations or A/D conversion, for example.

Gateway module 100 further comprises a network gateway 110 for connection to a higher level network 520. In gateway module 100 the internal signals are translated to the network 520 which is employed. The safety protocol is adapted to the higher level network 520, so that when the same physical interface is used the gateway module is only different in terms of the network protocols or is able to support a plurality of protocols. This makes it possible to use the same gateway module 100 for different networks and safety protocols.

Therefore, the only thing that is required according to the invention for capturing the physical signals in a safe manner and transmitting them to the gateway module is a diagnosis of the transfer path from the I/O module to the gateway module and a diagnosis of the peripherals and of the inputs/outputs.

In the illustrated exemplary embodiment, gateway module 100 and I/O modules 201 and 202 are configured as plug-on terminals whereby their local extent is limited so that a completely developed safety protocol is not required, but only a few technical measures against data corruption and irregularities in the data transfer. Safety communication is only necessary from the gateway module 100 into the higher level network 520.

Thus, all the I/O modules 201 and 202 are independent of which safety protocols are used in the higher level network 520, and so they can have the same configuration. The safety logic in gateway module 100 ensures safety data communication to the individual I/O modules and serves the individual diagnosis instances within the I/O modules.

Figure 3:
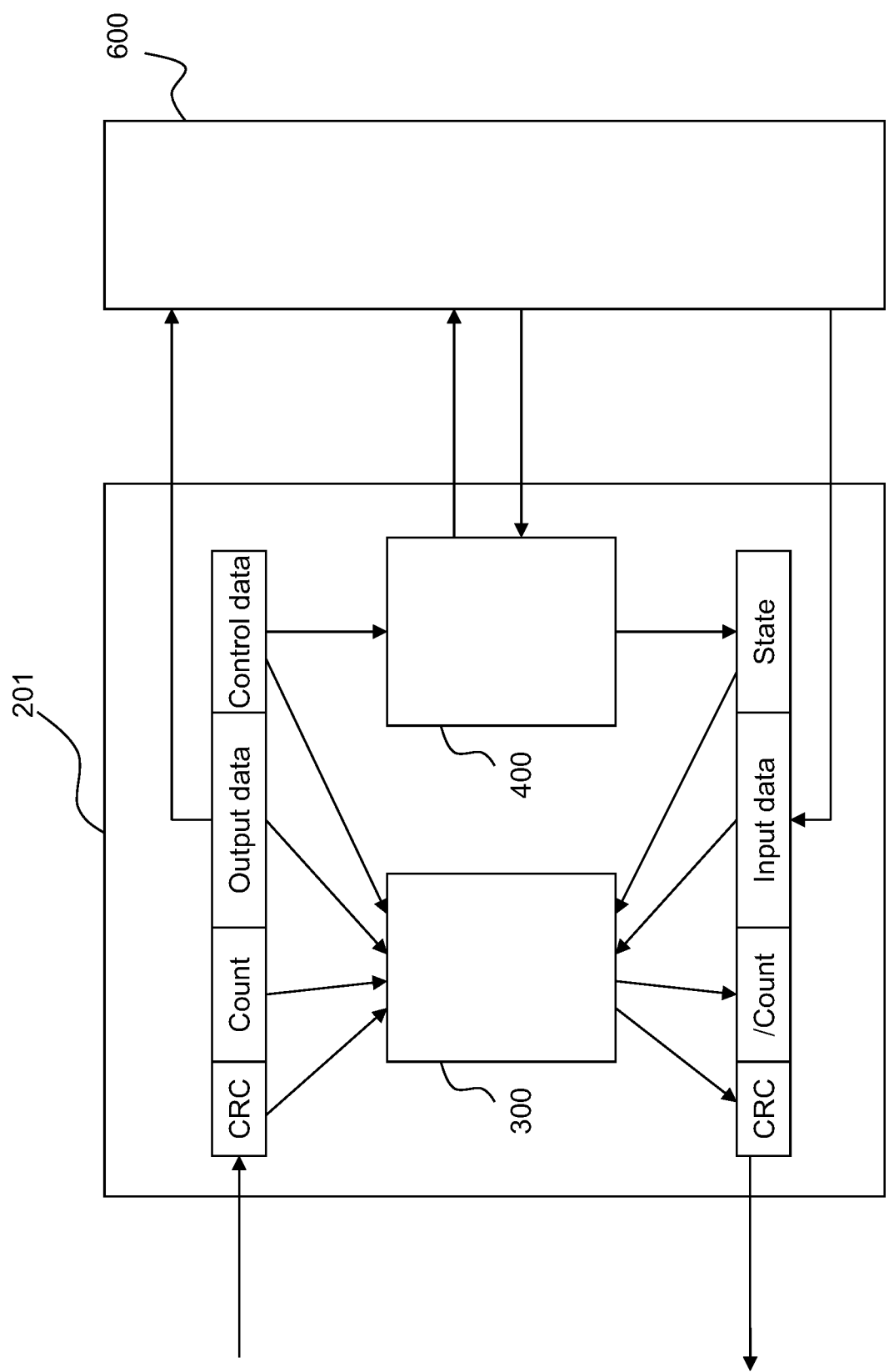
FIG. 3 schematically illustrates the data exchanged with an I/O module of the control and data transmission system shown in FIG. 2.

FIG. 3 illustrates, in schematic and simplified manner, which data the exemplarily selected I/O module 201 receives from gateway module 100, how these data are forwarded, and which data are returned to gateway module 100.

Safety communication between the safety logic of gateway module 100 and the I/O modules is ensured using a CRC. Additionally, each I/O module is preferably addressed with a counter of 8 bits, for example, which is different for each local I/O module and is incremented after each successful communication connection. The I/O module responds with a mirrored counter value. This counter value represents a diagnosis procedure for addressing the individual I/O modules. Due to the dynamics produced by the change in the counter value, also referred to as count for short, it is possible to detect further faults in the data transfer.

Figure 4:
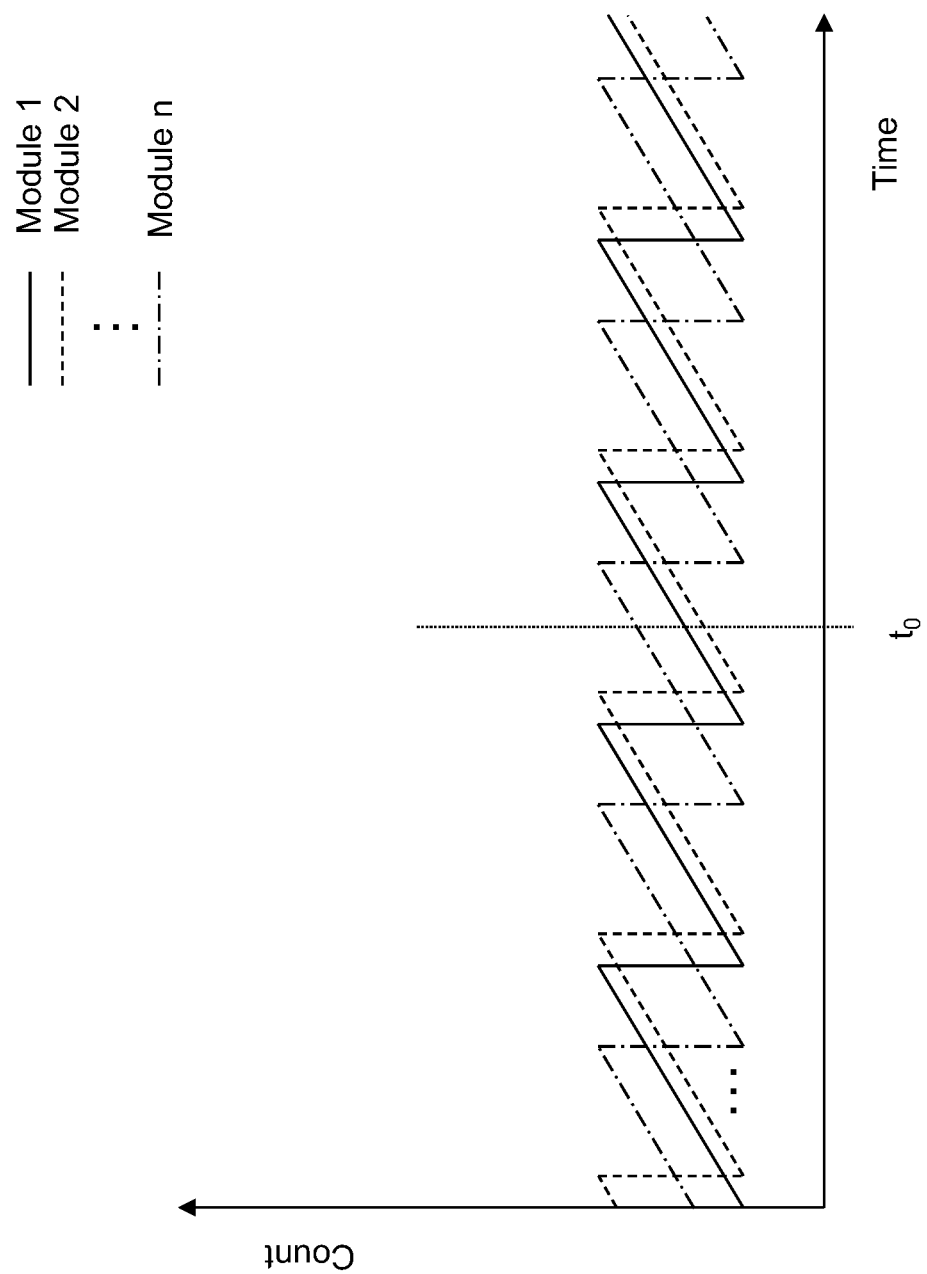
FIG. 4 schematically illustrates a time profile of counter values of individual I/O modules which are transmitted within data telegrams.

As shown in FIG. 4, each I/O module is addressed with a different counter. After each successful communication connection, all counters are incremented, up to a maximum value. Once the maximum value has been reached, each counter is reset to an initial value. In this manner, the counter values, or counts, for individual I/O modules differ for each data transmission, for example at time $t_0$. The continuous characteristics shown in FIG. 4 only symbolically reflect the course of the discrete counter values.

Referring back to FIG. 3, all the received data, including the count, output data, control data, and the CRC, are supplied to communication diagnosis unit 300 which checks the CRC and the count. The output data are directly output to the peripherals 600. The control data are supplied to diagnosis unit 400 and serve to remotely control diagnosis unit 400, i.e. for example, for defining which status data are to be provided by the diagnosis unit 400.

The data to be sent to the gateway module 100 include the mirrored count, input data, status data, and CRC. The input data provided by the peripherals and the status data generated by diagnosis unit 400 are supplied to communication diagnosis unit 300 for generating the CRC. For generating the status data, by diagnosis unit 400, communication in particular takes place between diagnosis unit 400 and peripherals 600.

The execution of the communication (state machine) takes place exclusively in the safety logic of gateway module 100. The individual I/O modules only use simple diagnosis instances which support the safety logic in the gateway module 100 in fault detection.

Different diagnosis instances may be provided in diagnosis unit 400 as well as in peripherals 600, which are addressed by the safety logic of the gateway module 100 and are checked for faulty behavior by the expectations in the safety logic. Separate safeguarding and evaluation of the diagnosis in the I/O modules is therefore no longer required.

The processing of the I/O data and of the diagnosis data is done exclusively in the gateway module 100.

Since the gateway module 100 performs the logic processing and is able to process both standard data and safety-related data, it is furthermore disclosed that the gateway module 100 takes over complete control of the inputs and outputs of the local station, i.e. the local I/O modules. The gateway module 100 may be employed as a local controller in a stand-alone mode and, in addition, it provides the necessary data for the higher level network 520 or can be controlled as a local smart station. The processing in the gateway module has the advantage that it can be executed much faster than in a higher level control unit, because the local station has more efficient and faster access to the local I/O data. Thus, shorter response times can be achieved. In addition, the higher level control unit is relieved.

The solution of the invention offers a number of advantages over the current prior art. A more flexible use of existing I/O modules for non-safety-relevant signals and a reduction in the number of different I/O modules within the system is achieved. In addition, all I/O modules can be configured independently of the higher level network. A simplification of the I/O modules moreover results because the latter need no longer be configured for safety capturing of the signals. Accordingly, few or no microprocessors are required within the station which includes the gateway module and the I/O modules, and overall complexity within the station is reduced. Furthermore, efforts in development, production, testing, and support are also reduced in this way. Moreover, depending on the local communication system, separate addressing of the modules for safety-related signals may also be omitted.

Furthermore, only one logic processing is required in the system. The gateway module is moreover capable of completely fulfilling the safety tasks as a separate station without connection to the higher level network, that is to say, not only detection of the inputs and outputs but also control within the local station can be realized. Both the safety signals and the standard signals can be used. Processing of the local I/O data in the gateway module is much faster than in a higher level control unit. Furthermore, it is conceivable that the centralized safety processing is performed not exclusively in the gateway module, but also at a different location, such as e.g. in a higher level safety control unit, or anywhere within the local station, and that the gateway module only functions as a gateway. In this case, the gateway module provides the data transfer to the devices and various services that are necessary to control the diagnosis units and the I/O data of the individual local devices.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a railing system. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights that include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A safety-related process control and data transmission system comprising:
   a plurality of single-channel I/O modules, each of the single-channel I/O modules comprising a communication diagnosis unit connected to a bus interface via registers for an input and an output of each respective single-channel I/O module for standard data signals that are non-safety-related signals;
   a gateway module, said gateway module and plurality of single-channel I/O modules communicable with each other through a local bus, said gateway module comprising a local bus master that generates a common data telegram, the common data telegram passing through each of the plurality of single-channel I/O modules in the manner of a shift register; and
   a diagnosis unit active within each of the single-channel I/O modules for generating at least one status data relating to a functional state of the inputs or the outputs of the respective single-channel I/O modules, transferring the status data to the gateway module and evaluating the input and the output for generating the status data,
   wherein a fault in communication between the gateway module and the single-channel I/O modules is detected in the gateway module by a checksum of a counter value using an individual counter that is provided in the common data telegram for each of the single-channel I/O modules, each respective individual counter having an initial value that is different for each of the respective single-channel I/O modules to provide an individual address for each of the respective single-channel I/O modules using the common data telegram, and
   wherein values of each of the individual counters are incremented from their respective initial values after successful communication of the common data telegram between the gateway module and the respective single-channel I/O modules, and
   wherein the status data generated at each single-channel I/O module is associated with a respective individual address.

2. The safety-related process control and data transmission system as claimed in claim 1, wherein the gateway module comprises a safety logic which is in particular configured so as to be redundant, for executing the safety-related logic processing of the status data and/or of the input data and/or output data.

3. The safety-related process control and data transmission system as claimed in claim 1, wherein the safety-related logic processing of the status data and/or the input data and/or output data comprises the execution of at least one safety function.

4. The safety-related process control and data transmission system as claimed in claim 1, wherein each of the plurality of single-channel I/O modules is configured as a modular input and a modular output device.

5. The safety-related process control and data transmission system as claimed in claim 1, wherein process control is performed by a control unit that is connected by a communication network to the gateway module or is performed by the gateway module.

6. The safety-related process control and data transmission system as claimed in claim 1, wherein the diagnosis unit of at least one of the plurality of single-channel I/O modules exchanges data with an associated diagnosis unit which is arranged in a process device connected to an input or an output of said at least one of the plurality of single-channel I/O modules.

7. The safety-related process control and data transmission system as claimed in claim 1, wherein the diagnosis unit of one of the plurality of the single-channel I/O modules and/or a diagnosis unit of a process device connected to one of the plurality of the single-channel I/O modules is controlled by a control data transmitted from the gateway module.

8. A gateway module for use in a safety-related process control and data transmission system as claimed in claim 1, comprising:

a safety control unit in the form of a safety logic adapted for executing safety processing of the status data.

9. An I/O module for use in a safety-related process control and data transmission system as claimed in claim 1, comprising:
- at least one input and/or output for connecting a process device, the process device being in the form of a sensor or actuator;
- a diagnosis unit for generating status data relating to the functional state of the input and/or output and/or of the process device connected to the input and/or output; and
- an interface for connection to a communication network; wherein the I/O module is adapted to communicate with the gateway module via the communication network in a safe manner, said I/O module comprising a communication diagnosis unit, said communication diagnosis unit comprising a unit configured for performing the safe communication.

10. The safety-related process control and data transmission system of claim 1, wherein the gateway module further comprises a safety control unit connected to the local bus master and the safety control unit comprising at least one redundant core capable of comparing results of a safety-related output data on the basis of a safety-related input data.

11. The safety-related process control and data transmission system of claim 1, wherein the gateway module further comprises a network gateway for connection to a higher level network, the gateway module supporting a plurality of protocols, and the single-channel I/O modules operate independent of which one of the plurality of protocols is employed by the higher level network.

12. The safety-related process control and data transmission system of claim 1, wherein when an individual counter reaches a maximum value, the counter is reset to an initial value.

13. The safety-related process control and data transmission system of claim 1, wherein a diagnosis unit in a single-channel I/O module is remotely controlled by the gateway module by transmitting a control data from the gateway module to the diagnosis unit.

14. The safety-related process control and data transmission system of claim 1, wherein each single-channel I/O module is configured to respond to receipt of the common data telegram by sending a mirrored counter value to the gateway module.

15. The safety-related process control and data transmission system of claim 14, wherein each single-channel I/O module sends the generated status data to the gateway module and the gateway module uses the mirrored counter values from the single-channel I/O modules to detect faults in data transfer from the single-channel I/O modules to the gateway module.

* * * * *